United States Patent
Braun et al.

(10) Patent No.: US 7,417,773 B2
(45) Date of Patent: Aug. 26, 2008

(54) METHOD AND SYSTEM FOR CREATING AND SENDING A FACSIMILE USING A DIGITAL PEN

(75) Inventors: John F. Braun, Weston, CT (US); John W. Rojas, Norwalk, CT (US); James R. Norris, Danbury, CT (US); Jean-Hiram Coffy, Norwalk, CT (US); Arthur Parkos, Southbury, CT (US); Alan Leung, New York, NY (US); Wendy Chui Fen Leung, Woodside, NY (US)

(73) Assignee: Pitney Bowes Inc., Stamford, CT (US)

( * ) Notice: Subject to any disclaimer, the term of this patent is extended or adjusted under 35 U.S.C. 154(b) by 880 days.

(21) Appl. No.: 10/065,281

(22) Filed: Sep. 30, 2002

(65) Prior Publication Data

US 2004/0061888 A1 Apr. 1, 2004

(51) Int. Cl.
H04N 1/44 (2006.01)
H04N 1/387 (2006.01)
H04N 1/32 (2006.01)
H04N 1/00 (2006.01)
G06K 3/02 (2006.01)
G06F 13/362 (2006.01)
G06F 12/14 (2006.01)

(52) U.S. Cl. .................. 358/403; 358/1.15; 358/400; 358/478

(58) Field of Classification Search ............... None
See application file for complete search history.

(56) References Cited

U.S. PATENT DOCUMENTS 1,684,756 A 9/1928 Close ..................... 462/67
3,273,123 A 9/1966 Lowitz ................... 382/202
5,140,645 A 8/1992 Whitaker ................ 382/184
5,243,149 A 9/1993 Comerford et al. ...... 178/18.03
5,294,792 A 3/1994 Lewis et al. ............. 250/221
5,299,026 A * 3/1994 Vincett et al. ........... 358/401
5,453,762 A 9/1995 Ito et al. ................. 345/179
5,511,148 A * 4/1996 Wellner .................. 358/1.6

(Continued)

FOREIGN PATENT DOCUMENTS

EP 1403755 A2 * 3/2004

(Continued)

OTHER PUBLICATIONS

Anoto Advertising Booklet—"Uniting Handwriting with the Digital World", undated, 15 pages.

(Continued)

*Primary Examiner*—Twyler L. Haskins
*Assistant Examiner*—Myles D Robinson
(74) *Attorney, Agent, or Firm*—George M. Macdonald; Angelo N. Chaclas (57) ABSTRACT

The present application describes systems and methods for composing and sending facsimile messages using a digital pointing instrument. In further configurations, a user utilizes a pen to indicate a reference to a document that is appended to the outgoing facsimile. In another further configuration, the user utilizes a form having pre-defined regions that are used to correlate a pen stroke with a desired action.

20 Claims, 4 Drawing Sheets

U.S. PATENT DOCUMENTS

| | | | |
|---|---|---|---|
| 5,561,446 A | 10/1996 | Montlick | |
| 5,586,036 A | 12/1996 | Pintsov | 705/408 |
| 5,587,560 A | 12/1996 | Crooks et al. | 178/18.03 |
| 5,612,720 A | 3/1997 | Ito et al. | 345/179 |
| 5,647,017 A | 7/1997 | Smithies et al. | 382/119 |
| 5,684,990 A | 11/1997 | Boothby | 707/203 |
| 5,767,496 A | 6/1998 | Swartz et al. | 235/462.1 |
| 5,861,958 A * | 1/1999 | Jamrog | 358/403 |
| 5,897,648 A | 4/1999 | Henderson | |
| 5,903,667 A | 5/1999 | Kuzuniki et al. | 382/187 |
| 5,974,177 A | 10/1999 | Krtolica | 382/202 |
| 6,009,416 A | 12/1999 | Pintsov | 705/410 |
| 6,050,490 A * | 4/2000 | Leichner et al. | 235/462.49 |
| 6,076,734 A * | 6/2000 | Dougherty et al. | 235/462.01 |
| 6,081,261 A | 6/2000 | Wolff et al. | 345/179 |
| 6,091,835 A | 7/2000 | Smithies et al. | 382/115 |
| 6,118,546 A * | 9/2000 | Sanchez et al. | 358/1.6 |
| 6,188,392 B1 | 2/2001 | O'Conner et al. | 345/179 |
| 6,201,903 B1 | 3/2001 | Wolff et al. | |
| 6,208,771 B1 | 3/2001 | Jared et al. | 382/306 |
| 6,229,102 B1 | 5/2001 | Sato et al. | 178/19.01 |
| 6,259,043 B1 | 7/2001 | Clary et al. | 178/18.01 |
| 6,307,956 B1 * | 10/2001 | Black | 382/124 |
| 6,310,988 B1 | 10/2001 | Flores et al. | 382/313 |
| 6,311,042 B1 | 10/2001 | DeSchrijver | 455/66 |
| 6,327,395 B1 | 12/2001 | Hecht et al. | 382/306 |
| 6,330,976 B1 | 12/2001 | Dymetman et al. | |
| 6,396,598 B1 | 5/2002 | Kashiwagi et al. | 358/474 |
| 6,422,474 B1 | 7/2002 | Gossweiler, III et al. | |
| 6,456,740 B1 | 9/2002 | Carini et al. | 382/187 |
| 6,502,756 B1 * | 1/2003 | Fåhraeus | 235/494 |
| 6,504,956 B1 * | 1/2003 | Gannage et al. | 382/188 |
| 6,548,768 B1 | 4/2003 | Pettersson et al. | 178/18.01 |
| 6,570,104 B1 | 5/2003 | Ericson et al. | 178/18.09 |
| 6,573,887 B1 | 6/2003 | O'Donnell, Jr. | 345/179 |
| 6,577,300 B2 | 6/2003 | Picoult et al. | 345/179 |
| 6,586,688 B2 * | 7/2003 | Wiebe | 178/18.09 |
| 6,594,406 B1 | 7/2003 | Hecht | 382/306 |
| 6,609,653 B1 | 8/2003 | Lapstun et al. | 235/375 |
| 6,618,040 B1 | 9/2003 | Mattaway | 345/173 |
| 6,627,870 B1 | 9/2003 | Lapstun et al. | 250/221 |
| 6,666,376 B1 | 12/2003 | Ericson | 235/454 |
| 6,674,427 B1 * | 1/2004 | Pettersson et al. | 345/179 |
| 6,681,045 B1 | 1/2004 | Lapstun et al. | 382/187 |
| 6,689,966 B2 * | 2/2004 | Wiebe | 178/18.01 |
| 6,694,045 B2 | 2/2004 | Chung et al. | 382/119 |
| 6,698,660 B2 | 3/2004 | Fåhraeus | 235/472.01 |
| 6,722,574 B2 * | 4/2004 | Skantze et al. | 235/494 |
| 6,773,177 B2 | 8/2004 | Denoue et al. | 400/88 |
| 6,795,060 B2 | 9/2004 | Rekimoto et al. | 345/173 |
| 6,873,430 B2 * | 3/2005 | Grasso et al. | 358/1.16 |
| 6,895,507 B1 * | 5/2005 | Teppler | 726/19 |
| 6,903,833 B1 * | 6/2005 | Murata et al. | 358/1.15 |
| 6,917,724 B2 * | 7/2005 | Seder et al. | 382/321 |
| 6,941,510 B1 | 9/2005 | Ozzie et al. | 715/513 |
| 6,970,583 B2 | 11/2005 | Black | 382/124 |
| 6,972,862 B2 * | 12/2005 | Tang et al. | 358/1.15 |
| 6,972,864 B2 | 12/2005 | Lapstun et al. | 358/1.15 |
| 7,003,308 B1 * | 2/2006 | Fuoss et al. | 455/466 |
| 7,094,977 B2 * | 8/2006 | Ericson et al. | 178/18.01 |
| 7,110,576 B2 * | 9/2006 | Norris et al. | 382/119 |
| 7,113,293 B2 * | 9/2006 | Mori et al. | 358/1.13 |
| 7,131,061 B2 * | 10/2006 | MacLean et al. | 715/512 |
| 7,134,606 B2 * | 11/2006 | Chou | 235/494 |
| 7,224,991 B1 * | 5/2007 | Fuoss et al. | 455/466 |
| 7,322,524 B2 * | 1/2008 | Silverbrook et al. | 235/454 |
| 7,343,042 B2 * | 3/2008 | Braun et al. | 382/203 |
| 2001/0055411 A1 | 12/2001 | Black | 382/124 |
| 2002/0002539 A1 | 1/2002 | Fahraaeus et al. | 705/51 |
| 2002/0006212 A1 | 1/2002 | Rhoads et al. | 382/100 |
| 2002/0035687 A1 | 3/2002 | Skantze | 713/168 |
| 2002/0054334 A1 * | 5/2002 | Harrison et al. | 358/1.15 |
| 2002/0057824 A1 | 5/2002 | Andreasson | 382/101 |
| 2002/0065042 A1 | 5/2002 | Picoult et al. | |
| 2002/0065101 A1 | 5/2002 | Picoult et al. | |
| 2002/0067854 A1 | 6/2002 | Reintjes et al. | 382/199 |
| 2002/0080386 A1 | 6/2002 | Snowdon et al. | |
| 2002/0107885 A1 | 8/2002 | Brooks et al. | 707/505 |
| 2002/0126105 A1 | 9/2002 | O'Donnell, Jr. | 345/179 |
| 2002/0146170 A1 | 10/2002 | Rom | 382/175 |
| 2002/0169963 A1 | 11/2002 | Seder et al. | 713/176 |
| 2002/0193975 A1 | 12/2002 | Zimmerman | 703/6 |
| 2003/0001020 A1 | 1/2003 | Kardach | 235/494 |
| 2003/0046256 A1 | 3/2003 | Hugosson et al. | 707/1 |
| 2003/0103238 A1 * | 6/2003 | MacLean et al. | 358/1.18 |
| 2003/0133629 A1 | 7/2003 | Sayers | 382/313 |
| 2003/0145212 A1 * | 7/2003 | Crumly | 713/186 |
| 2003/0169458 A1 * | 9/2003 | Quach | 358/400 |
| 2003/0214681 A1 * | 11/2003 | Bohan | 358/468 |
| 2004/0061690 A1 * | 4/2004 | Braun et al. | 345/179 |
| 2004/0134690 A1 * | 7/2004 | Norris et al. | 178/19.01 |
| 2005/0013104 A1 * | 1/2005 | Feague et al. | 361/683 |
| 2005/0052700 A1 * | 3/2005 | Mackenzie et al. | 358/1.18 |
| 2005/0052707 A1 * | 3/2005 | Nelson et al. | 358/3.28 |
| 2005/0097337 A1 * | 5/2005 | Sesek et al. | 713/186 |
| 2005/0179956 A1 * | 8/2005 | Silverbrooks et al. | 358/3.28 |
| 2005/0231746 A1 * | 10/2005 | Parry et al. | 358/1.13 |
| 2006/0075340 A1 * | 4/2006 | Coffy | 715/541 |
| 2006/0176505 A1 * | 8/2006 | Burke et al. | 358/1.15 |
| 2007/0035774 A1 * | 2/2007 | Kubo | 358/3.28 |

FOREIGN PATENT DOCUMENTS

| | | |
|---|---|---|
| EP | 1403756 A2 * | 3/2004 |
| EP | 1403777 A2 * | 3/2004 |
| EP | 1404106 A2 * | 3/2004 |
| EP | 1439497 A2 * | 7/2004 |
| JP | 10-222241 | 8/1998 |
| JP | 2001-43000 A | 2/2001 |
| WO | WO 01/16691 A1 | 3/2001 |
| WO | WO 01/26032 A1 | 4/2001 |
| WO | WO 01/95091 A1 | 12/2001 |

OTHER PUBLICATIONS

Anoto Advertising Booklet—"Hey, Guess What Those Nifty Swedes Have Dreamed Up Now to Revolutionize Digital Communiction?!", undated, 22 pages.

"A Comparison of Anoto Technology with Other Releeant Systems." Undated. 17 pages.

Anoto Functionality—World Wide Web pages from www.anotofunctionality.com. Accessed Jan. 29, 2004. 7 pages.

Unknown Anoto, Subsidiary of C Technologies, Initiates Collaboration with John Dickinson, UK's Leading Producer of Stationary Products, Apr. 23, 2001, Business Wire, 2 pages.

* cited by examiner

FACSIMILE COVER SHEET

| TO: John Doe | FROM: Jane Doe |
|---|---|
| COMPANY: Como Corporation | DATE: September 7, 2002 |
| FAX NUMBER: 203 000 0000 | TOTAL PAGES INCLUDING COVER: 15 |
| PHONE NUMBER: 203 000 0001 | |
| RE: Testing a fax | |

ATTACHMENTS:

| 0238820 | Sales Contract Addendum |
|---|---|
| 0238820 | Sales Contract Draft 1 |
| | |

NOTES / COMMENTS:

Dear John:

I have attached the current draft of the sales contract and an addendum.
Please let me know if you have any questions.

Thank You

Jane

[SEND] [ABORT]

METHOD AND SYSTEM FOR CREATING AND SENDING A FACSIMILE USING A DIGITAL PEN

BACKGROUND OF INVENTION

The illustrative embodiments disclosed in the present application are useful in systems including those for processing facsimile messages and more particularly are useful in systems including those for sending facsimile messages using a digital pen.

Traditional facsimile machines are typically found in small to large corporate offices and are often found in the small office/home office (SOHO) settings. Facsimile machines may be found in small retail businesses, hotels, schools and in stores providing such services to individuals as a retail service. Such typical facsimile machines include a chassis having a connection to an analog telephone line, an analog modem for communication and a keypad for dialing the telephone number of a receiving facsimile machine. Such typical facsimile machines include a monochromatic (black and white), one bit per pixel scanner for facsimile output and a printer for output. The printer technology utilized in traditional facsimile machines include thermal printing, inkjet printing and laser printing. The scanner input and printing engine are typically limited to 8.5-inch wide paper. Accordingly, the size of documents that may be sent using a traditional facsimile machine is limited. The traditional facsimile machine is limited in the size of documents that may be printed, although incoming documents may in some cases be scaled to fit the available paper size.

The traditional facsimile machine receives documents that may be typed or handwritten. The documents are scanned into a facsimile transmission format that is typically compressed. The sender inputs the recipient telephone number, the facsimile machines negotiate a connection and protocol and the facsimile is transmitted as a compressed monochromatic bitmap representation of the original.

More recently, facsimile service systems have become available for general-purpose computers such as the Windows/Intel personal computer platforms in which a user may send a computer file such as a word processing file to a recipient facsimile machine. In such a system, the file is typically converted to a facsimile format file such as TIFF and the computer uses its analog modem to send the facsimile as if it had been scanned into a facsimile machine. These systems are useful only when the document to be sent is available in some digital form and are not useful for sending handwritten information such as a signed letter. Certain other systems utilize a general-purpose scanner and general-purpose computer to provide the functionality of a traditional facsimile machine.

In using a traditional facsimile machine, a user may handwrite a cover sheet having the number of pages and the origin and destination information written on it. The user will then send the facsimile cover sheet with the attached letter to the intended recipient by dialing the recipient facsimile machine number and starting the transmission.

Accordingly, user must have access to the attached letter at the traditional facsimile machine or on the general-purpose computer of the facsimile service system. Such a user may be required to walk to the neatest facsimile machine and may also be required to wait in line for an available facsimile machine or scanner for a facsimile service system. Similarly, the user of a facsimile service system must have access to the general-purpose computer to process a facsimile and may also have to wait for an available scanner. A reference entitled method and apparatus for pen-based faxing is shown in U.S. Pat. No. 6,201,903 issued Mar. 13, 2001 to Wolff, et al. and is incorporated herein by reference. The reference describes a system for designating a recipient of a facsimile using strokes made with a pen.

SUMMARY OF INVENTION

The present application describes illustrative embodiments of systems and methods for composing and sending facsimile messages using a digital pointing instrument. In further illustrative embodiments, a user utilizes a pen to write a reference to a document that is appended to the outgoing facsimile. In a further illustrative embodiment, the user utilizes a form having pre-defined regions that are used to correlate a pen stroke with a desired action. In another further illustrative embodiment, a back-end facsimile processor updates the facsimile cover sheet before sending it using obtained or calculated information such as the number of pages attached.

DETAILED DESCRIPTION

A method and system for sending a facsimile using a digital pen is described. While facsimile machines are commonplace in locations such as offices, they are relatively large devices that include a fixed width scanner. Facsimile machines are typically stationary and connected to a telephone line. Facsimile service software programs that typically utilize a personal computer with a modem connected to a telephone line allow a user to select a facsimile enabled print driver in order to convert a currently displayed document into a facsimile format to be sent using the facsimile capable modem. In such a system, the personal computer may be equipped with a scanner used to digitize documents, but the scanner typically has the capability to scan documents that are not wider than a letter size sheet of paper. Facsimile machines also typically have a letter size scanner width that limits the width of a document that can be transmitted using the facsimile machine.

Digital pointing devices such as the pen and tablet systems available from Wacom Technology Corp. of Vancouver, Wash. allow a user to utilize a computer to capture pen strokes that the user traces over a tablet. Digital pointing devices may utilize capacitive sensors or other grid-based sensors to determine absolute or relative position of the pointing device.

Digital pens allow a user to capture or digitize handwriting or pen strokes that the user writes on a medium such as a piece of paper by using a processor such as a personal computer. Certain digital pens utilize an imaging device to scan or record an image of the pen stroke. Certain other digital pens use mechanical sensors in order to record a pen stroke. The pen systems may utilize positioning systems such as light-based scanning systems including infrared (ir) sources and detectors in order to determine an absolute or relative position of the pen. Digital pen systems include the N-Scribe system available from Digital Ink of Wellesley, Mass. and the E-Pen system available from E-Pen InMotion of Matam, Haifa Israel. A digital pointing device includes the V-Pen system available from OTM Technologies of Herzliya Israel.

Another digital pen system is the Sony-Ericsson CHA-30 Chatpen and Anoto paper available from Anoto AB of Sweden. The Chatpen utilizes a Bluetooth transceiver in order to communicate with a processor and the Anoto paper includes a grid encoding information such position information that is detected by the Chatpen. Additional information may be captured including information related to pressure, speed and pen attitude. The additional information includes biometric information that may be used to identify or authenticate a user.

Commonly owned, co-pending U.S. patent application Ser. No. 09/727,893 and filed Nov. 30, 2000 describes systems for remote retrieval of messages and is incorporated herein by reference.

Commonly owned, co-pending U.S. patent application Ser. No. 09/707,561, filed Nov. 7, 2000 describes systems for remote retrieval of documents and is incorporated herein by reference.

Commonly owned, co-pending U.S. patent application Ser. No. 09/728,237, filed Nov. 30, 2000 describes systems for remote printing of documents and is incorporated herein by reference.

Co-pending U.S. patent application Ser. No. 10/065,282, entitled Method And System For Creating a Document Having Metadata, filed on Sep. 30, 2002, is incorporated by reference in its entirety.

Co-pending U.S. patent application Ser. No. 10/065,283 480, entitled Method And System For Identifying a Form Version, filed on Sep. 30, 2002, is incorporated by reference in its entirety.

Co-pending U.S. patent application Ser. No. 10/065,284, entitled Method And System For Remote Form Completion, filed on Sep. 30, 2002, is incorporated by reference in its entirety.

Co-pending U.S. patent application Ser. No. 10/065,285, entitled Method And System For Identifying a Paper Form Using a Digital Pen, filed on Sep. 30, 2002, is incorporated by reference in its entirety.

The Digital Pen.

The present application describes systems and methods for composing messages using a pointing device. The illustrative embodiments described herein utilize a digital pen in order to compose and send a facsimile. However, other sensing devices may be utilized to compose other messages.

The digital pen is utilized to capture information regarding the pen strokes of a user. In the illustrative embodiments described herein, a Chatpen and Anoto paper is described. However, other digital pens may be utilized. Certain digital pens utilize position determination be determining the actual location of the pen on a piece of paper in order to provide a relative location in terms of the location in the space of the piece of paper. Certain digital pens scan the ink as it is applied to digitize a stroke while others sense the stroke using sensors such as pressure sensors, Doppler sensors, accelerometers and other sensing mechanisms.

The Chatpen and Anoto paper provide a pen the writes using ink on paper printed with an Anoto pattern. The Chatpen includes a sensor to detect the Anoto pattern. The detected pattern identifies the relative pen location on a grid of the pattern using a pattern look-up processor that may be locally or remotely resident. The relative location allows the pen stroke and pattern look-up processor to determine where the pen is on a defined logical space of the pattern. Certain logically defined two-dimensional areas of the pattern may be defined as representing certain functions. For example, Anoto paper may be printed with a box that includes a particular portion of the pattern that is attributed the meaning of "Send Facsimile." The media may be printed with an indication to the user that such box has been attributed that meaning or that portion of the pattern may be used in a box that is mandatory for a facsimile cover sheet such as the "To:" number field. The form may be preprinted with the format of a facsimile cover page.

Using the Chatpen, the stroke, biometric and pattern position information is sent to the pen stroke processor via a wireless Bluetooth™ communications channel that is secure across a personal area network. Accordingly, a facsimile message is composed without a facsimile machine or facsimile scanner using a digital pen that is portable.

The illustrative embodiments describe methods and apparatus for capturing pen strokes, input data such as commands. Additional methods and apparatus for composing and sending the messages are described. The processes and apparatus described may be implemented using hardware, software or a combination of both. The communications channels may be wireless or wired and may utilize security techniques such as encryption. The data storage and data processors may be locally or remotely located.

The Message Composition System.

Figure 1:
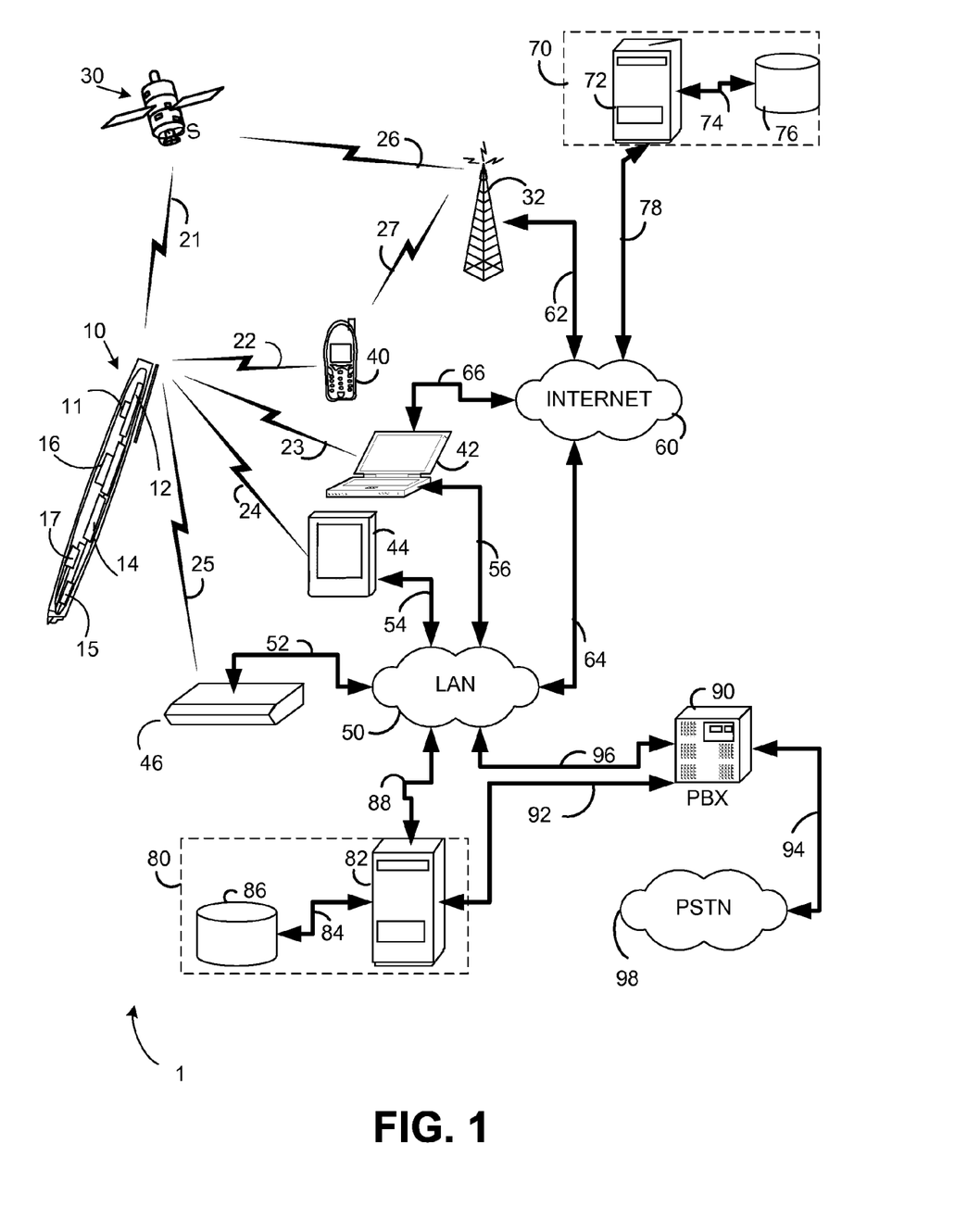
FIG. 1 is a schematic representation of a digital pen facsimile service system according to an illustrative embodiment of the present application.

Referring to FIG. 1, a first illustrative embodiment describing a digital pen facsimile service system 1 is shown.

Digital Pen 10 includes a processor 14, memory 12, ink 17, a camera or image sensor 15, a battery 16 and a wireless transceiver 11. It also includes biometric sensors (not shown). In an alternative, the ink 17 is machine detectable. In another embodiment, the ink is invisible.

The pen 10 includes a pen tip (not shown) that writes using the ink 17. Writing sensors (not shown) provide data regarding the stroke such as pressure, speed and pen attitude.

In one embodiment, the digital pen is a Chatpen using a Bluetooth™ transceiver. Bluetooth™ utilizes several layers of security. At a link level, remote/local device authentication is required before any communication can take place. At the Channel level, a link level connection occurs and then the devices need to authenticate before a communications channel is established. Additionally, the data payload being transmitted may be encrypted. In this embodiment, appropriate security at several protocol layers is utilized including the application layer.

In an alternative, the pen includes audio input/output including synthesized voice output and voice recognition. Visual output is provided using an LCD display and LEDs and tactile feedback is provided using servomechanisms. Physical input includes an input button.

The embodiments described herein may utilize biometric data for purposes including identification and authentication of a user. In this embodiment, the digital pen 10 is a Chatpen digital pen available from Anoto, AB. The pen 10 provides biometric data relating to the pen strokes used including hand speed, pen tip pressure and the inclination angle between pen and paper. Such data is referred to herein as BIODATA. In alternative embodiments, the BIODATA may include other biometric data such as a retinal scan or fingerprint scan performed using an external processor such as laptop 42 that is co-located with the pen or by the pen 10. The pen 10 is assigned a unique identification code that is a unique serial number for the pen. In an alternative, the PUID is a Bluetooth™ MAC code or other unique or group assigned code.

The system 1 includes at least one pen 10 that establishes a personal area network using Bluetooth™. The paired device may be a Bluetooth™ router 46 that connects to the digital pen 10 using wireless connection 25 and provides a gateway using communications connection 52 to a system LAN 50 or to the Internet 60 (connection not shown). The paired device may include a wireless capable PDA 44 that has a Bluetooth connection 24 and a connection 54 to the LAN 50. Similarly, the digital pen 10 may connect using wireless connection 23 to laptop 42 that is connected to the LAN 50 by connection 56 and the Internet 60 using connection 66. Furthermore, the digital pen 10 may be paired with cellular telephone 40 using connection 22. The cellular telephone 40 is connected to cellular base station 32 using connection 27. Additionally, the digital pen may send or receive signals using satellite 30 using channel 21. The signals may include GPS or other signals. The satellite may be connected to a communications network such as the cellular system using connection 26.

Here, the system 1 includes a server 80 that includes storage 86 connected by connection 84 to processor 82. The server 80 is connected to the LAN 50 using communications channel 88. Here, the server hosts files that may be used as attachments and authentication data for users. The server 80 is connected to a Private Branch Exchange (PBX) 90 using connection 92. The PBX 90 is connected to the Public Switched Telephone Network 98 (PSTN) using connection 94 that may be a T1 line. The PSTN is the telephone network used to transmit facsimile messages. The PBX 90 is also connected to LAN 50 using connection 96 and is accessible to the devices such as the gateway 46, PDA 44 and Laptop 42. The cellular system 32 is also connected to the PSTN 98 (not shown) and the cellular system 32 is connected to the Internet 60 using connection 62.

Furthermore, server 70 is connected to a network such as the Internet 60 using connection 78. Server 70 includes processor 72 connected to storage 76 using connection 74. Here, the Anoto pattern lookup service may be remotely located and may be accessed while determining pen location and other pattern lookup related data.

The system 1 provides several security options including having biometrics data stored for comparison in a database on a secure server 80.

The Handheld processor 44 is a PDA including a docking cradle or wireless connection for access to a LAN 50. Coarse position information regarding digital pen 10 location can be determined by locating the paired device such as cellular telephone 40 that can be located by triangulation if transmitting.

Cellular telephone 40 is connected to cellular operator system 32. The cellular telephone could simply provide a data link such as a GSM link. In an alternative, the cellular telephone could include additional processing capacity and be used to capture and/or manipulate data. Corporate LAN 50 is connected to the Internet 60 using T1 line 64. Alternatively, the connections could be over private lines or may be a Virtual Private Network. It is contemplated that all of the connections utilize appropriate security measures.

Other well-known input devices, servers, processors, networks and communications mechanisms may be used. A back-end application may be utilized to process pen strokes. The back end application then recognizes command strokes or strokes in command locations identified by the pattern. The data written by a user in a particular data input flied can be rasterized and then subjected to Optical character recognition (OCR) in order to identify the data written by the user.

Laptop 42 utilizes a mobile Pentium 4 processor and Windows XP. The server processors are geographically and load balanced application servers using systems available from Sun Microsystems and the storage servers use multiple location redundant backup systems. Additionally, other appropriate wireless and wired networks and connections may be utilized. It is contemplated that other communications channels such as OC-3 lines or wireless connections could be used in place of the T1 lines. Similarly, the other communications channels could be replaced with alternatives. As can be appreciated, various communication flows may be utilized, some of which will be chattier than others. Laptop 42 could also provide gateway access to the TCP/IP Internet network.

The present embodiment may alternatively use any pen or stylus like device that provides for electronically recording strokes. Position information may be processed into strokes or transmitted in a separate data stream.

The digital pen 10 approximates the size of a traditional pen and may be used by a user to handwrite information. The digital pen may detect pattern information that may be relayed to a pattern lookup server 70 across the Internet 60. Responsive information may then be sent back to the message processor.

Here, the co-located processor 44, 42, 40 or remote processor 82 may receive pen data including stroke data, pattern data and other input data.

Transmitter/receiver 11 transmits and receives signals to and from the paired base unit 40, 42, 44, 46 that provide a communications link for sending pen data that is used by the message processor to compose and send a message such as a facsimile message.

The message processor can be implemented in the local co-located processor being used such as 40, 42, 44 or in a remote processor such as 72 or 82. The message processor may include processes such as pen stroke input processing, form and command processing and message composition and communications processing. In an alternative, pen 10 and the message processor provide handwriting recognition. The message processor may include handwriting recognition or may employ a limited set of symbol recognition for command processing. Using the Anoto pattern lookup, the system may rely on the pattern to determine commands rather than be recognizing strokes.

Figure 2:
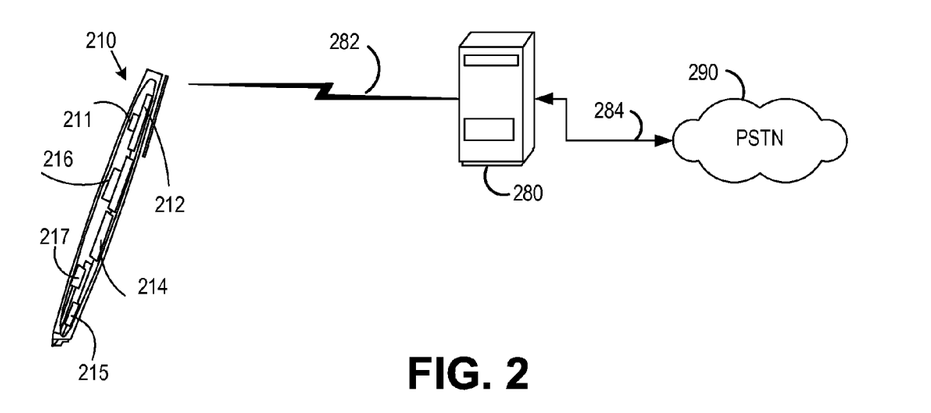
FIG. 2 is a schematic representation of a digital pen facsimile service system according to another illustrative embodiment of the present application.

Referring to FIG. 2, a schematic representation of a digital pen facsimile service system according to a second illustrative embodiment is shown. Digital pen 210 includes a processor 214, memory 212, ink 217, a camera or image sensor 215, a battery 216 and a wireless Bluetooth transceiver 211. It also includes biometric sensors (not shown). The pen 210 includes a pen tip (not shown) that writes using the ink 217. Writing sensors (not shown) provide data regarding the stroke such as pressure, speed and pen attitude. Here, the pen is connected to server 280 using wireless connection 282. The server is connected to PSTN 290 using communications link 284. the server includes a file server for attachments and authentication files and a processor for message processing.

Figure 3:
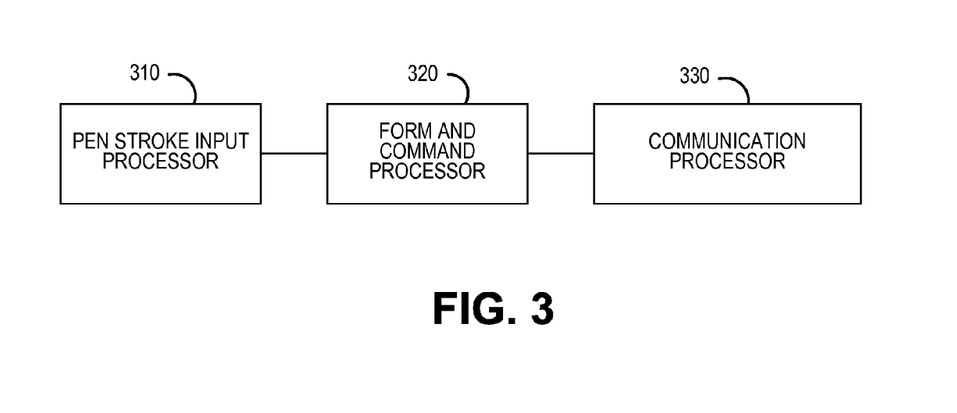
FIG. 3 is a schematic representation of a data processing system of a digital pen facsimile service system according to an illustrative embodiment of the present application.
Figure 4:
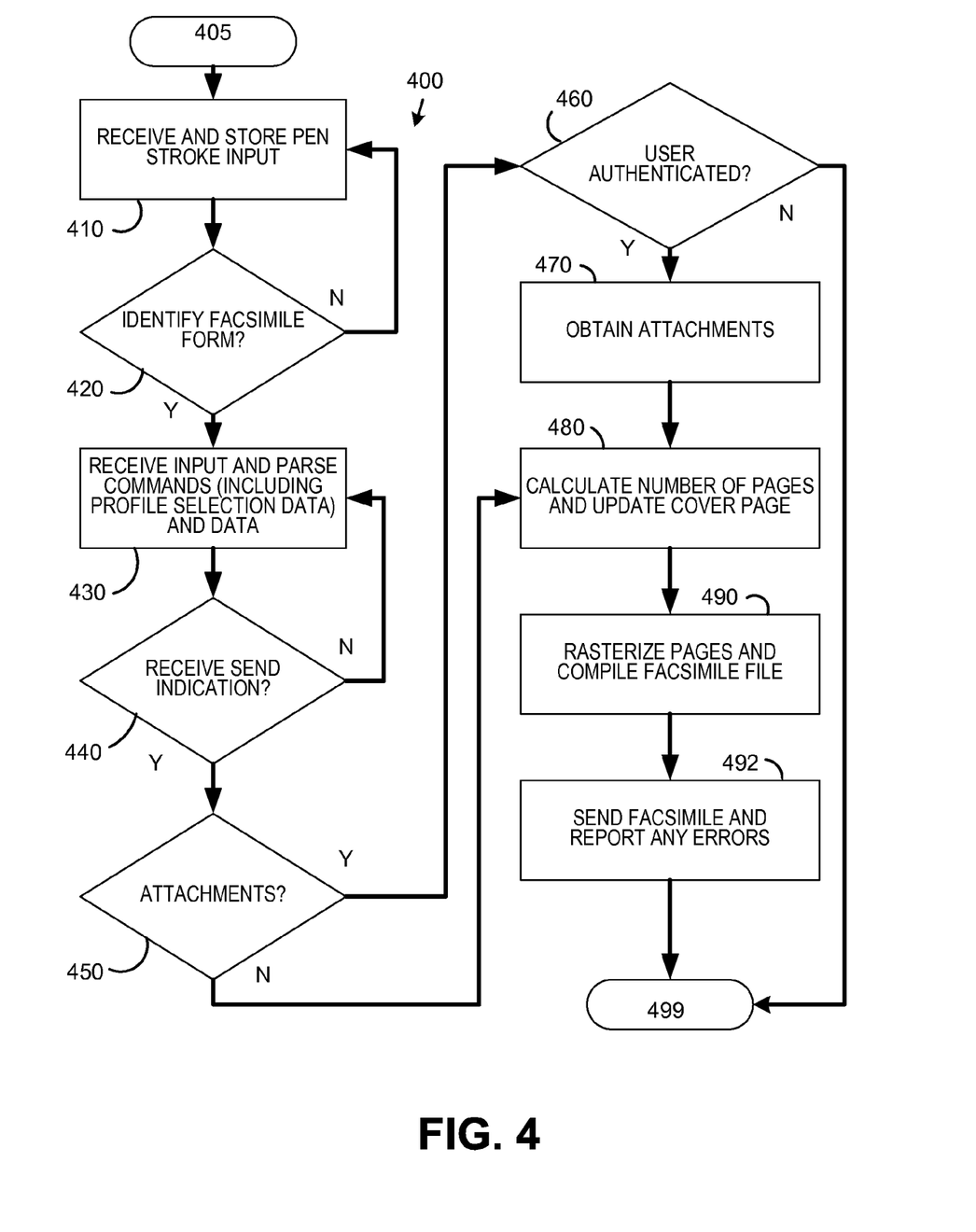
FIG. 4 is a flow chart showing a process for generating facsimile messages according to another illustrative embodiment of the present application.
Figure 5:
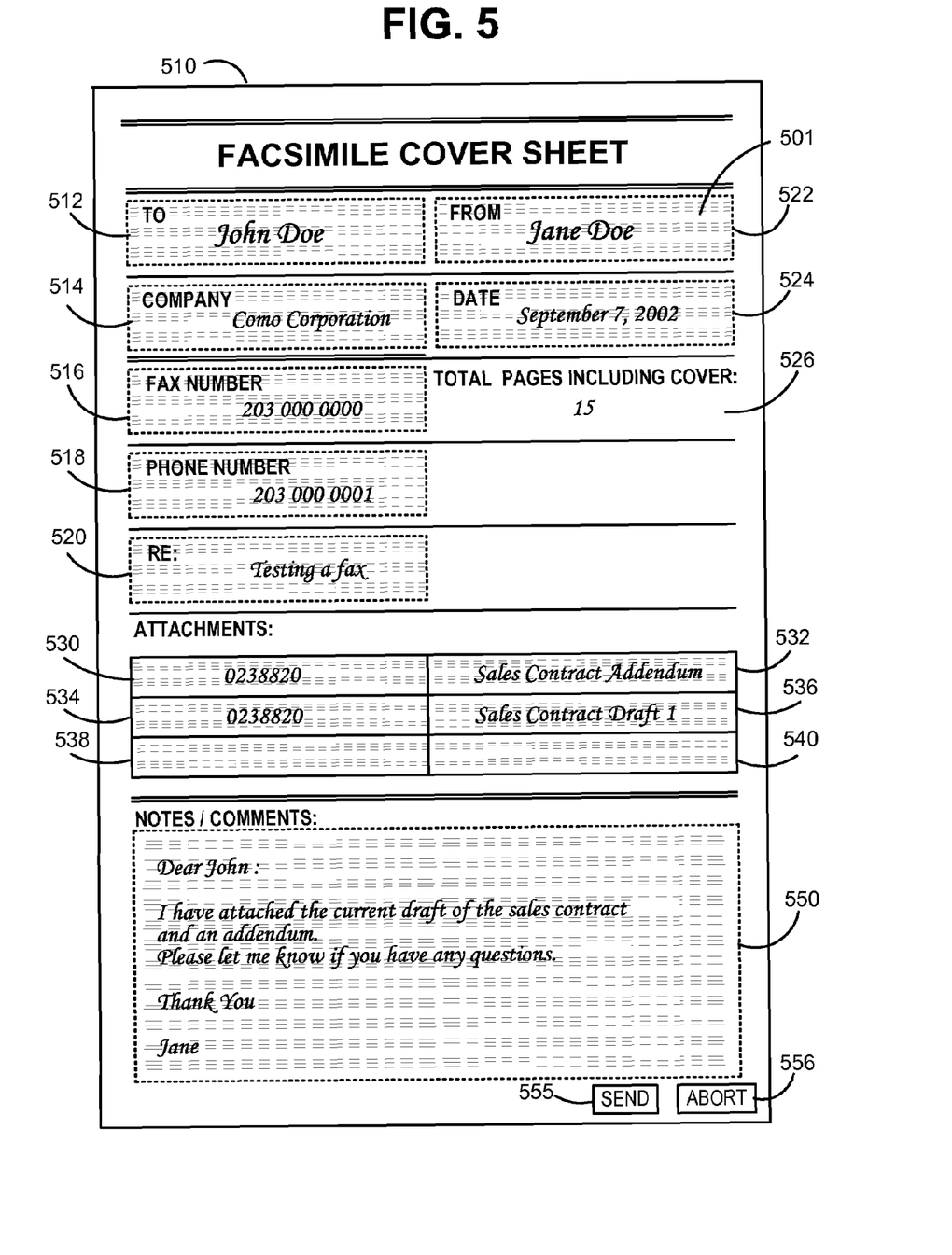
FIG. 5 is a top view of a facsimile cover sheet form according to an illustrative embodiment of the present application.

Referring to FIG. 3, a schematic representation of a data processing system of a digital pen facsimile service system according to a third illustrative embodiment is shown. Here the digital pen (not shown) includes the message processor including pen stroke input processor 310, form and command processor 320 and communication processor 330. The communication processor is used to retrieve attachments and to send the composed facsimile after it is composed using the retrieved attachments. Accordingly, the entire facsimile service is included in the digital pen (not shown). Referring to FIGS. 4 and 5, a process for composing a facsimile message is described.

In this illustrative embodiment, the intelligence or attributed properties are in the form of a pattern 501 that is either pre-printed on the media 510 or printed by any laser printer capable of printing it. The pattern 501 may cover the entire form or only selected portions of it.

The pattern 501 is available from Anoto AB and is used such that the grid uniquely defines 2 dimensional portions of an enormous 2-dimensional map. Accordingly, the abstract grid location could be assigned many meanings including a map to a relative or absolute position on a media such as an address filed and destination facsimile field.

Facsimile Cover Sheet 510 includes an Anoto pattern 501 and several preprinted fields. Field 512 is the recipient name filed and field 514 is the related recipient company filed name. Field 516 is the recipient fax number and filed 518 is for the recipient phone number. Filed 520 is a subject field. Field 522 is the sender id field and field 524 is the date field. Field 526 is the number of pages field and the message processor determines the data for this field. Fields 530, 534 and 538 are attachment fields for inputting attachment identification data. Fields 532, 536 and 540 are the respective description fields that may be determined by the message processor. Field 550 includes the message field. Fields 555 and 556 include boxes that indicate send and abort.

Referring to FIG. 4, a process 400 for composing a facsimile message is described. The process beings in step 405 and the message processor receives and stores pen stroke input data in step 410. Here, the pen stroke data may be a data feed in the wireless channel or data sent from a paired device such as a PDA. In step 420, the message process 400 determines if the form being written on is a facsimile form. If so, the process proceeds to step 430 to parse the input and any commands and data. The input process continues until a send indication is received at step 440. In 450, the message process determines if attachments are requested. If attachments are not requested, the process proceeds to step 480.

If attachments are requested, the process proceeds to step 460 to authenticate the user using biometric information as shown above. The message process accesses a database of known biometric data for the user and authenticates the user. In step 470, the message process 400 uses the user identification and authentication in order to identify and locate the attachment files and obtain the file. The user information may make an ambiguous reference to an attachment non-ambiguous. The authentication data may be used to ensure that only authorized users have access to the attachments. For example, in Windows XP, a file may have various levels of permissions. Here the pen and user identification data may be used to identify the level of permission needed and whether the file can be sent to the message processor. Here, the message processor may utilize the biometric data to obtain password information necessary for the message processor to access the requested files.

As another example, the user may identify attachment 0238820. This identifier may be a document control serial number obtained from the footer of a document. The user identification may identify the server and document management system that the user has access to and that information may be used to locate the file and to ensure the user has permission to access it. In an alternative, the system also determines whether the recipient has permission to access the file using a lookup table of recipient names or locations.

In step 480, the process calculates insert data such as the number of pages, date or attachment descriptions. The insert data is then placed into the form. In step 490, the facsimile cover sheet and attachments are rasterized and compiled into a facsimile file. In step 492, the facsimile is sent and any errors are reported. The process then ends in step 499.

Here, the message processor can use the data entered into the recipient name field 512 to determine what information to use in recipient company name filed if it is not provided. Additionally, the message processor may determine the date or the date entered may be verified.

In an alternative embodiment, a digital pen using position sensors similar to those used in a graphics drawing tablet is utilized. In this alternative, the media is defined as a template based upon position. The template could be stenciled on to the media such as a label or envelope in order to aid the user in proper placement of the data. The processor that is processing the data input into the template could offer a user a template selection to choose from, each with its own data location template definition. In another alternative, the template form identifier is placed in machine or human readable form on the media. The digital pen is then used to read the form identifier using a scanning technique or by the user tracing over the form number.

In another alternative embodiment, other biometric data may be utilized. For example, the digital pen 10 may be paired with an external processor such as a PDA such that a shared secret is provided to the pen 10 and the PDA 50. In one alternative, the user does not type in a device PIN for pairing, but a central data system uses unique identifiers such as MAC codes to pair devices. Thereafter, the PDA could also be used to capture biometric data related to a user. In an alternative, the user is authenticated using a customer number and password. Alternatively, the user could be authenticated using biometrics and the pen could be authenticated using its unique Bluetooth 48 bit MAC address.

In an alternative, selection boxes for profiles may be provided. For example, a user may have a profile for personal messages and a profile for business messages. The profile may include template text to add to the message and may include style commands to dictate how the data is processed.

In another embodiment, a digital pen uses paper that is not preprinted as a facsimile cover page. The user writes a command on the paper that is interpreted by a facsimile processor. For example, the user writes ">facsimile to: Bob" and ">message: see attached" and ">attach: business plan" and ">signed: script signature." Here, the facsimile processor is used to parse the command to determine that a facsimile is being composed and is to be sent to Bob. The facsimile processor authenticates the user and searched a database of potential recipients. If Bob unambiguously defines a single or group recipient, the facsimile processor expands the destination data into a form facsimile cover sheet. The facsimile processor then digitizes the message field into the cover sheet. The facsimile processor also parses the attach command. The facsimile processor uses information that may include the pen identifier, a user identifier to locate the attachment. The pen may authenticate the user. The facsimile processor may use the pen or user identity to determine the path and filename of the attachment and may use the pen or user identity of related data to gain access to the appropriate file server. The facsimile server may determine that the sender is cleared to access the intended attachment. In an alternative, the recipient must also be cleared to receive the attachment.

The facsimile processor then recognizes the "signed" command that is also used to indicate that the facsimile should be sent. In an alternative, a button or other input such as voice recognition is used to indicate that the user is ready to send the facsimile. Here, the facsimile processor then processes the attachment data and determines the number of pages for the cover page. The facsimile is composed in the proper file format and sent to the recipient facsimile number using known facsimile techniques.

In an alternative, the composed facsimile message is sent to the recipient, but also logged into an outgoing facsimile queue in a mailroom facility. Accordingly, the facsimile can then be processed in case of an error or other processing requirement. For example, the pen id or other user biometric data may be utilized to identify the sender and the sender's current contact information may be determined. The mailroom employee may then contact the sender if the message was not processed properly.

In another embodiment, the digital pen includes a pen stroke processor, a form and command processor and a communication processor including an analog cellular modem such that the digital pen includes the entire system for composing and sending a facsimile. In another alternative, the digital pen includes an attachments processor that uses the cellular modem to log into a file server, authenticate the user, identify the desired attachments, retrieve the desired attachments and compose and send the facsimile. The digital pen utilizes attachment data to fill in fields of the facsimile such as the cover sheet number of pages and the description field for the facsimile attachments.

In another alternative, the attachment may be printed on Anoto pattern as well. So for example, document number 0238820 version 5 may be printed on Anoto pattern and the user has a copy. The user may trace over or otherwise input the document number into the message processor and an annotate command is issued. Here, the system obtains document number 0238820 version 5, processes the users annotations and attaches the annotated document as a facsimile attachment.

In any of the described embodiments, error indications or messages may be communicated using LED indicators, a display such as an LCD display or audio indications such as beeps or synthesized speech using a speaker. Additionally, tactile feedback may be utilized to indicate an error condition or provide other feedback such as an indication that a facsimile was successfully sent.

In any of the described embodiments, the user may wish to receive a receipt that can be traced back to the facsimile that the user wrote and sent. In the embodiments described above, the composed facsimile message may be saved as a record of the facsimile and may be stored with a received receipt. Here, the user may want to correlate the original writing with the version sent. In this embodiment, the rasterized image is stored and used to identify the source writing. In another embodiment, the user writes a command for an identification value that is used to identify the source writing. In yet another alternative, a digital signature is developed for the original writing and it is sent with the facsimile message. In another alternative, the user may send a digital signature that is used to authenticate the message. Here, the biometric data from the pen strokes is used with the key of the user to provide non-repudiation of the facsimile message.

In another alternative applicable to any of the embodiments, Wi-Fi enabled wireless systems are utilized and the external processor comprises a Wi-Fi capable hand-held pocket PC such as the Toshiba e740 Pocket PC. Furthermore, differing types of processors and logic systems may be supported. For example, JAVA based PALM OS devices may be utilized. The message logic, processing logic, security logic, user interface logic, communications logic and other logic could be provided in JAVA format or in a format compatible with individual platforms such as Windows CE and PALM OS. Similarly, other portable computing devices such as laptop computers and tablet computers and wireless capable computers could be utilized. Other platforms such as those using Symbian OS or OS-9 based portable processors could be utilized.

In another alternative applicable to any of the embodiments, authentication procedures utilize a token controller having a secure token key storage such as an iButton® available from Dallas Semiconductor in which an attack, for example, a physical attack on the device, results in an erasure of the key information. Passwords may be used, such as a password to access the device. In an alternative, the password may include biometric data read from a user. Alternatively, other secret key or public key systems may be utilized. Many key exchange mechanisms could be utilized included a Key Encryption Key. Additionally, authentication and repudiation systems such as a secure hash including SHA-1 could be utilized and encryption utilizing a private key for decryption by public key for authentication.

The present application describes illustrative embodiments of a system and method for composing messages using a pointing device and in one embodiment describes a digital pen system for composing and sending a facsimile. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for composing a facsimile message comprising:
    capturing strokes made by a user with a pointing instrument that include indications of data including facsimile message data and command data;
    processing the strokes in order to determine a recipient designated by the strokes,
    determining a template for a cover page for the facsimile message using the strokes;
    processing the strokes in order to determine an attachment identifier relating to at least one attachment requested for the facsimile message;
    requesting the at least one attachment from a server that is remote from the pointing instrument using the attachment identifier;
    receiving the at least one attachment from the server;
    composing the facsimile message using the cover page template, the facsimile message data and the at least one attachment; and
    sending the facsimile message to the recipient.

2. The method of claim 1 wherein
    the pointing instrument is a digital pen and strokes are provided by the user writing on a paper media having a pattern.

3. The method of claim 2 further comprising:
    capturing user authentication information related to the user;
    determining user identification data; and wherein requesting the at least one attachment includes using the user identification data and the attachment identifier to identify the location of the attachment.

4. The method of claim 3 wherein:
the user authentication information includes biometric data.

5. The method of claim 4 wherein:
the biometric data includes pen stroke data including stroke pressure, stroke speed and pen attitude.

6. The method of claim 5 wherein
the pen stroke data includes the attachment identifier identifying the at least one attachment, further comprising:
identifying the at least one attachment using the biometric data;
authenticating the user using the user authentication information; and
verifying user permission to access the at least one attachment file and stopping the facsimile message composition process if the user does not have permission to access the at least one attachment file.

7. The method of claim 6, further comprising:
determining determined message data using the at least one attachment; and
modifying the facsimile message using the determined message data.

8. The method of claim 7, wherein,
the determined message data comprises the total number of pages of the composed facsimile message; and
modifying the facsimile message includes updating a number of pages field on the facsimile cover page with the total number of pages.

9. The method of claim 6, further comprising:
unambiguously identifying the at least one attachment using a combination of data including at least the attachment identifier and the user data.

10. The method of claim 2 wherein
the command data includes an indication of a send facsimile command, and
the command data includes profile selection data.

11. The method of claim 10 wherein
the send facsimile command is indicated by the user writing a stroke in a segregated field of the media.

12. The method of claim 2 wherein
the template determination utilizes the pattern.

13. A system for composing a facsimile comprising:
a processor;
a storage device connected to the processor;
the storage device storing a logic program;
the processor operative with the logic program to perform:
  capturing strokes made by a user writing with a digital pen on a media having a pattern, the strokes including indications of data including facsimile message data and command data;
  processing the strokes in order to determine a recipient designated by the strokes,
  determining a template for a cover page for the facsimile message using the strokes and the pattern;
  capturing user authentication information related to the user;
  wherein the command data includes an indication of a send facsimile command;
  processing the strokes in order to determine at least one attachment requested for the facsimile message;
  requesting and then receiving the at least one determined attachment from a server that is remote from the digital pen;
  composing the facsimile message using the facsimile message data and the at least one attachment; and
  sending the facsimile message to the recipient.

14. The system of claim 13 wherein:
the processor is operative with the logic program to perform determining user identification data; and
wherein requesting the at least one determined attachment includes using the user identification data to identify the location of the at least one determined attachment.

15. The system of claim 14 wherein:
the user authentication information includes biometric data; and
the biometric data includes pen stroke data including stroke pressure, stroke speed and pen attitude.

16. The system of claim 15 wherein
the pen stroke data includes an attachment identifier identifying the at least one attachment, further comprising the processor operative with the logic program to perform:
identifying the at least one attachment using the biometric data;
authenticating the user using the user authentication information; and
verifying user permission to access the at least one attachment file and stopping the facsimile message composition process if the user does not have permission to access the at least one attachment file.

17. The system of claim 16, further comprising the processor operative with the logic program to perform:
determining determined message data using the at least one attachment; and
modifying the facsimile message using the determined message data.

18. The system of claim 16, further comprising the processor operative with the logic program to perform:
unambiguously identifying the at least one attachment using a combination of data including at least the attachment identifier and the user data.

19. A system for sending a facsimile of a message comprising:
a receiver to receive pen stroke data and user identification data from a digital pen including attachment data indicating at least one attachment;
a processor to process pen stroke data; and
a file server connected to the processor, wherein the processor uses pen stroke data and the user identification data to locate the at least one attachment and uses pen stroke data to verify permission to access the at least one attachments;
the processor further configured to compose the facsimile message using the at least one attachment if permission to access the at least one attachment is verified; and
the processor further configured to send the facsimile message.

20. The system of claim 19, wherein,
the processor uses the user identification data to verify permission to access the at least one attachment.

* * * * *